Patented July 13, 1948

2,445,007

UNITED STATES PATENT OFFICE 2,445,007

DYESTUFFS OF THE ANTHRAQUINONE SERIES

George W. Seymour, Victor S. Salvin, and Clarence E. Hieserman, Cumberland, Md., assignors to Celanese Corporation of America, a corporation of Delaware No Drawing. Application July 24, 1945, Serial No. 606,884

2 Claims. (Cl. 260—380)

This invention relates to the preparation of certain anthraquinone dyestuffs, and relates more particularly to the preparation of anthraquinone dyestuffs for the dyeing of cellulose acetate or other organic derivative of cellulose materials.

An object of this invention is to provide improved anthraquinone dyestuffs having an affinity for cellulose acetate or other organic derivative of cellulose materials and capable of dyeing said materials in fast, reddish blue shades having an unusual resistance to acid fading.

Other objects of this inventon will appear from the following detailed description.

Anthraquinone dyestuffs represent an important group of dyestuffs widely employed in the dyeing of textile materials. Excellent dyeings may be obtained on cellulose acetate or other organic derivative of cellulose materials employing certain dyestuffs of the anthraquinone series. While these dyestuffs yield excellent dyeings in a wide range of shades, it has been observed that many of these dyestuffs, especially those dyeing in blue shades, are subject to fading when exposed to an acid atmosphere such as that formed on the combustion of coal, gas and the like. The fading may cause a dulling in the shade of the dyed material or, in more serious cases, may even effect a complete alteration in shade, the blue color either taking on an undesirable reddish cast or fading entirely to a pink color. Anthraquinone dyestuffs dyeing cellulose derivative materials in blue shades which are highly resistant to acid fading have constantly been sought.

We have now found that anthraquinone dyestuffs of the following general formula:

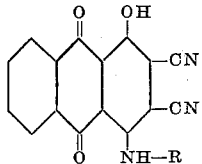

wherein R is an alkyl, cycloalkyl, aryl or alkaryl group, not only dye cellulose acetate or other organic derivative of cellulose material in desirable blue shades but the dyed materials obtained exhibit an unusual degree of resistance to acid fading. In our novel dyestuffs R may be, for example, a methyl, ethyl, propyl, butyl, dodecyl, cyclohexyl, phenyl, tolyl or benzyl group.

The novel dyestuffs of our invention may be prepared by reacting a 1-hydroxy-2-sulfo-4-substituted-amino-anthraquinone with sodium cyanide or potassium cyanide in an aqueous medium at a temperature of 75 to 90° C. Preferably, about 0.1 mol of the 1-hydroxy-2-sulfo-4-substituted-amino-anthraquinone are dissolved in 4000 to 6000 parts by weight of water, 0.8 to 1.6 mols of sodium or potassium cyanide added thereto and the reaction mixture heated up to the desired reaction temperature, say, 90° C., and the temperature maintained for 5 to 12 hours. A cyano group enters the 3-position followed by replacement of the sulfo group present in 2-position by a second cyano group. The anthraquinone dyestuff formed may be filtered from the alkaline reaction medium, since it is insoluble, and may then be washed free of unreacted 1-hydroxy-2-sulfo-4-substituted-amino-anthraquinone with a dilute acid such as, for example, dilute aqueous acetic acid, the insoluble dyestuff being left behind.

In order further to illustrate our invention, but without being limited thereto, the following example is given:

Example 10 parts by weight (.025 mol) of 1-hydroxy-2-sulfo-4-butylamino-anthraquinone are dissolved in 1000 parts by weight of water at 60° C. and 20 parts by weight (0.4 mol) of sodium cyanide added thereto. The addition of the sodium cyanide precipitates the anthraquinone compound forming an aqueous suspension of the latter. The suspension is raised to a temperature of 90° C. and maintained at this temperature for six hours to complete the reaction. The suspended product is filtered and extracted with dilute acetic acid to remove unreacted 1-hydroxy-2-sulfo-4-butylamino-anthraquinone. The dyestuff formed, i. e. 1-hydroxy-2,3-dicyano-4-butylamino-anthraquinone, has an excellent degree of affinity for and dyes cellulose acetate materials in attractive reddish blue shades when applied in an aqueous dispersion or by solvent dyeing methods. When cellulose acetate material dyed with this dyestuff is exposed to an acid atmosphere in accordance with the standard A. A. T. C. C. test for 16 hours no change in shade is observed and only a very slight change may be detected after 40 hours exposure.

It is to be understood that the foregoing detailed description is given merely by way of illustration and that many variations may be made there in without departing from the spirit of our invention.

Having described our invention, what we desire to secure by Letters Patent is:

1. The anthraquinone dyestuff of the following formula:

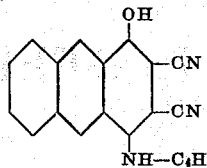

2. Process for the production of the anthraquinone dyestuff of the following formula:

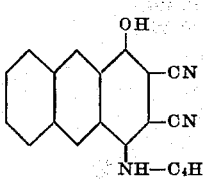

which comprises reacting 1-hydroxy-2-sulfo-4-butylamino-anthraquinone with sodium cyanide in an aqueous medium.

GEORGE W. SEYMOUR.
VICTOR S. SALVIN.
CLARENCE E. HIESERMAN.

REFERENCES CITED

The following references are of record in the file of this patent:

UNITED STATES PATENTS

| Number | Name | Date |
|---|---|---|
| 1,938,029 | Kugel | Dec. 5, 1933 |
| 2,134,654 | Lulek | Oct. 25, 1938 |
| 2,168,947 | Zerweck et al. | Aug. 8, 1939 |
| 2,258,551 | Grossmann | Oct. 7, 1941 |

OTHER REFERENCES

Perkin and Kipping, "Organic Chemistry," Part I (1919), pages 400 and 408.

Marschalk, "Bull. Soc. Chim. de France," 5th Series, vol. 2, pages 1809 to 1830 (1935).

Fieser, "Organic Chemistry" (1944), page 227.